April 11, 1950     D. C. GIBSON ET AL     2,504,018
SCREW OPERATED CLUTCH

Filed Nov. 15, 1945     2 Sheets-Sheet 1

INVENTOR
DAVID C. GIBSON
WALTER E. LEMP
BY George F. Goodyear
ATTORNEY

INVENTOR
DAVID C. GIBSON
WALTER E. LEMP
BY George F. Goodyear
ATTORNEY

Patented Apr. 11, 1950

2,504,018

UNITED STATES PATENT OFFICE 2,504,018

SCREW OPERATED CLUTCH

David C. Gibson, Richmond Heights, and Walter E. Lemp, St. Louis, Mo., assignors to Curtiss-Wright Corporation, a corporation of Delaware Application November 15, 1945, Serial No. 628,944

6 Claims. (Cl. 192—48)

This invention relates to coupling mechanisms. More particularly, it relates to a coupling mechanism in which a drive shaft is automatically coupled to and uncoupled from a driven shaft.

It is an object of this invention to provide an automatic coupling and uncoupling mechanism associated with driving and driven shafts wherein the shaft combination may be rotated in unison for a predetermined number of revolutions before being uncoupled, thereafter permitting continued rotation of the driving shaft with no further rotation of the driven shaft, and wherein upon reversal of the direction of rotation of the driving shaft the shaft combination is almost immediately brought again into a coupled relation for united rotational operation. It is another object to provide such a coupling mechanism having the foregoing operational characteristics and to arrange the coupling mechanism between driving and driven shafts for effecting a coupled condition therebetween only during a limited or predetermined number of revolutions or turns of the driving shaft in a given direction of rotation for imparting to the driven shaft a predetermined operational limitation in a given direction of rotation thereof. It is a further object to provide, in an automatically operating coupling and uncoupling mechanism of the character noted, means permitting the driving shaft portion of the mechanism unrestrained freedom for continued rotation in either direction while the driven shaft is permitted only a limited rotational operation in one direction and continuous rotation in the opposite direction with the driving shaft. A still further object is the provision of a clutch structure for the coupling mechanism having certain constructional improvements, particularly with relation to the form and arrangement of the coacting clutch teeth or driving elements whereby the foregoing objects may be attained with certainty and definiteness.

Figure 1:
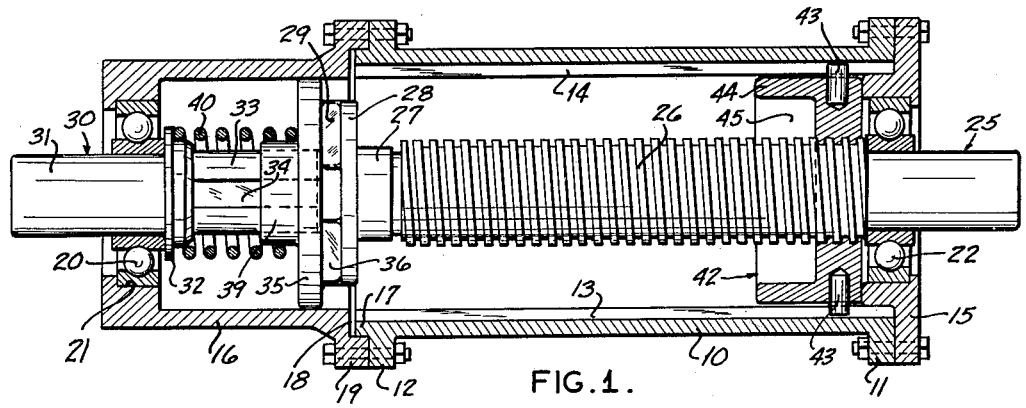
Figure 2:
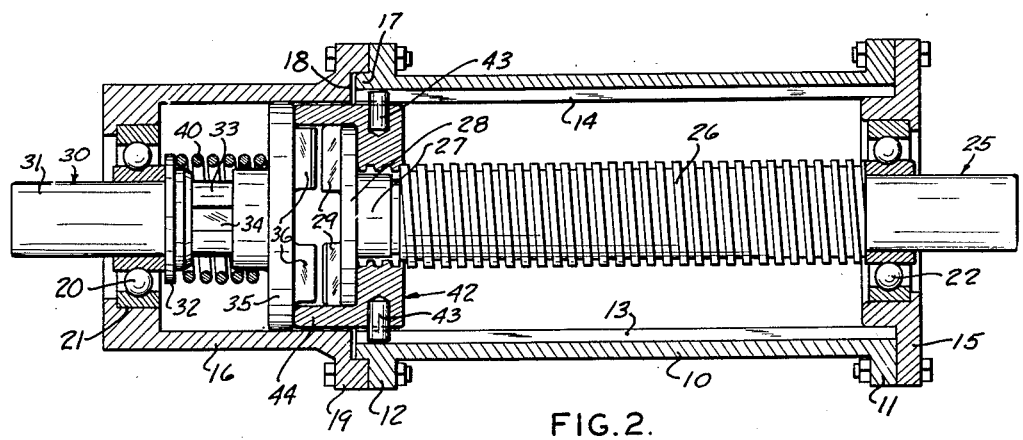
Figure 3:
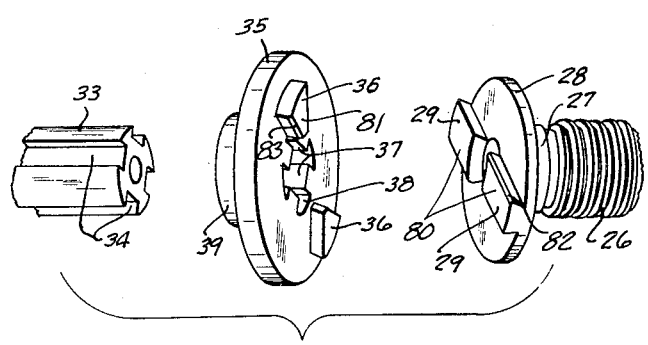
Figure 4:
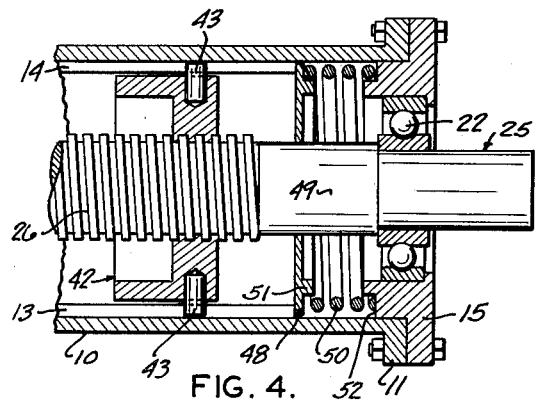
Figure 5:
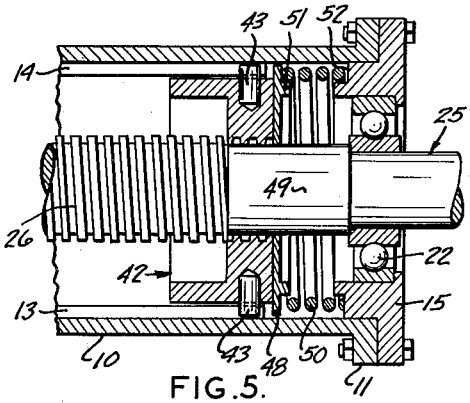
Figure 6:
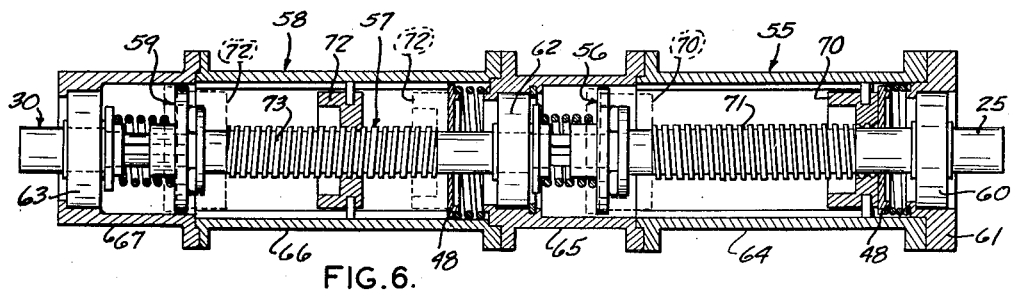
Figure 7A:
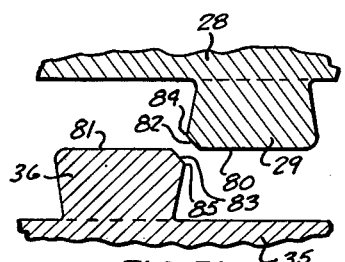
Figure 7B:
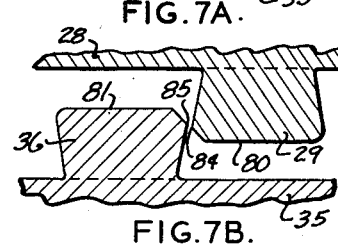
Figure 7C:
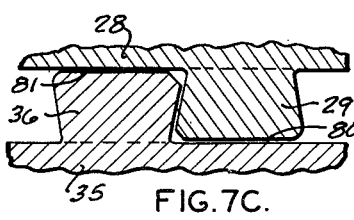
Figure 8C:
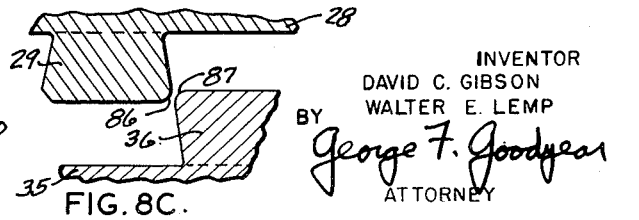

Other objects and attendant advantages concerning the several embodiments of the present invention will be pointed out in connection with a description thereof when considered with the accompanying drawings, in which: Figure 1 is a longitudinal sectional elevation of one form of the coupling mechanism showing the driving and driven shafts in coupled relation; Figure 2 is a longitudinal sectional elevation of the mechanism of Figure 1 but shown with the driving and driven shafts in uncoupled relation; Figure 3 is a fragmentary, exploded perspective view of the coupling clutch members illustrating details thereof; Figure 4 is a longitudinal sectional elevation of a portion of the coupling mechanism of Figure 1 showing details of a modified arrangement of parts; Figure 5 is a sectional view similar to that of Figure 4 but indicating a different stage in the operation of the mechanism; Figure 6 is a longitudinal sectional elevation of a still further arrangement of the combination of coupling mechanisms of Figures 1 and 4 wherein two such devices are placed in end-to-end relation so that a driven shaft may be rotationally limited in each direction; Figures 7A, 7B and 7C illustrate in progressive stages the action of the clutch teeth from the period just prior to engagement to full engagement; and Figures 8A, 8B, 8C and 8D illustrate the successive stages of clutch teeth positions during the period of clutch disengagement.

In Figures 1 and 2 there is shown a coupling mechanism of the character noted which includes a primary cylindrical housing member 10 having end flanges 11 and 12 and a pair of diametrically opposed longitudinal grooves or channels 13 and 14 formed in the internal wall surfaces as shown and extending throughout the length of the housing. A closure plate or cap 15 is suitably secured to the flange 11 at one end of the housing member 10 while a secondary housing member 16 is adapted to be secured to the flange 12 to form an extension of the internal space of the housing member 10. The housing member 16 is concentrically positioned on the housing member 10 by a projecting annular shoulder 17 which is received in an annular recess 18 formed in the flanged portion 19 of the secondary housing member 16. Provision is made in the end wall of the housing member 16 for mounting a shaft supporting ball bearing 20, the outer race of which is retained by an annular recess formed therein, as at 21. Similarly, the closure plate 15 is formed to receive a shaft supporting ball bearing 22.

A driving shaft 25, which may be connected to any convenient power source such as an electric motor (not shown), is mounted in bearing 22 with a threaded portion 26 enclosed by the housing member 10. The inner end of the shaft 25 is formed with a cylindrical unthreaded surface 27, the diameter of which is equal to the minor or root diameter of the threaded portion 26, and a flanged portion or clutch plate 28 which is provided with a pair of axially projecting and generally radially extending clutch teeth or dogs 29 on its end face (Figure 3). A second shaft 30, which in this case is the driven shaft, is mounted in bearing 20 with an outwardly extending portion 31 for connection to whatever device or mechanism it is desired to be operated. The portion of the shaft 30 positioned in the housing 16 is formed with a flanged shoulder 32 and an inwardly extending portion 33 in which straight splines or grooves 34 have been cut. The spline shaft 33 carries a clutch plate 35 which through a pair of clutch teeth or dogs 36 meshes with the clutch member 28 for imparting rotation of the driving shaft to the driven shaft. Clutch plate 35 is axially movable on shaft 30 due to the splines 34 but is prevented from relative rotation by the lugs or complementary spline teeth 37 formed internally of the bore 38 in the hub 39 of this clutch member.

The normal tendency of the clutch member 35 is to seek a position in driving engagement with the complementary clutch member 28 because of a coil spring 40 which abuts the flange 32 and also the rear face of the member 35 in the manner shown. Thus the driving shaft 25 and driven shaft 30 are normally maintained in driving connection for either direction of rotation of the shaft 25. The mechanism of the present invention, however, provides means for limiting the rotation of the driven shaft 30 with or without stoppage of the drive shaft. To do this a traveling element or cup-nut 42 is arranged to be threaded back and forth on the portion 26 of shaft 25. The nut 42 is prevented from rotational displacement by a pair of locking pins 43 mounted at opposite points in the periphery of the nut and projecting radially outwardly into the longitudinal grooves 13 and 14. The cup-nut 42 is provided with an overhanging annular flange portion 44, which defines a recess space 45, the flange having a sufficient internal diameter to clear the clutch member 28 as the latter is received in the recess 45 upon movement of nut 42 in the direction for shaft disconnection. Moreover, the extent of overhang of the flange 44 is sufficient so that it may extend beyond the member 28 and contact clutch member 35 in a zone outwardly of the teeth elements 36 and forcibly urge the member 35 away from driving engagement with member 28.

The operation of the coupling mechanism is initiated by power being applied to shaft 25 to turn it in a clockwise direction (as viewed from the right end of Figure 1), whereupon the traveling nut 42 will be caused to move to the left by the threaded portion 26 over which it rides. Shaft portion 26 is provided with a single thread so that nut 42 always maintains its phase relationship with respect to the clutch unit. The number of thread turns provided in shaft portion 26 will determine the degree of rotational displacement of the driven shaft 30 before uncoupling of the clutch unit 28—35 occurs. The nut 42 is advanced along the single thread on shaft 26 without rotational displacement until its flanged portion 44 passes over the clutch member 28 and contacts the peripheral face portion of complementary clutch member 35. The nut 42 is, at this point, still riding on the threaded portion 26 and consequently will continue to move to the left until it rides off the last thread turn and onto the shaft portion 27. Continued rotation of the drive shaft will maintain the nut on the unthreaded shaft zone 27, but it will be seen from Figure 2 that the nut flange 44 has moved the clutch member 35 out of driving engagement with member 28. The spring return element 40 is now compressed from its initial position since member 35 has been displaced on the splined shaft 33 an amount sufficient to break the meshing engagement of clutch teeth 29 and 36. When the clutch connection is broken in the manner noted, shaft 25 may continue to rotate but shaft 30 comes to a stop. Upon reverse rotation of shaft 25, the spring 40 will press the nut 42, through contact of clutch plate 35 with flange 44, into the threads on shaft portion 26 where the initial thread turn will pick up the nut and cause it to move to the right. This movement of the nut will move clutch plate 35 from its disconnected position (Figure 2) and allow the clutch plates 28 and 35 to mesh (Figure 1), thus causing rotation of driven shaft 30. The cup-nut 42 may then travel to its extreme right hand position where it abuts the inner face portions of closure plate 15. At this point the shaft 25 will stop rotating due to jamming of the nut 42 and threads on portion 26 or by the action of a cut-out switch or over-riding clutch (not shown) associated with the electric motor or other power means selected to drive shaft 25. With this arrangement, it is preferred that a cut-out agency be incorporated with the power unit so that the nut 42 will not jam against the face of closure plate 15.

An improved coupling unit is illustrated in Figures 4 and 5, the improvement relating only to an arrangement of parts whereby the traveling nut 42 may be run off the threaded portion 26 to prevent a jammed condition but may be automatically rethreaded upon reversal of the drive shaft rotation. In other respects the coupling mechanism is similar to that in Figs. 1 and 2. The mechanism for permitting nut 42 to run off the threaded shaft portion and to return it for threading movement comprises a disc 48 loosely mounted over an unthreaded portion 49 of the shaft 25 and adapted to be urged outwardly from the closure member 15 by a coil spring 50, the latter element being retained in position by an annular shoulder 51 on disc 48 and a peripheral notch or recess 52 formed in end plate 15. The shaft portion 49 provides a support and bearing surface for the nut 42 when in the run-off position (Figure 5). The guide channels 13 and 14 for the pins 43 which act to prevent rotational displacement of the traveling nut 42 terminate at a point spaced from the end of the housing 19 and also provide an abutment shoulder for limiting the outward movement of the disc member 48 under pressure developed from coil spring 50. Consideration of Figures 4 and 5 will serve to indicate the manner in which the above mechanism operates to permit complete freedom of drive shaft rotation with the traveling nut at its rearward position (Figure 5). The structure of Figure 4 may be embodied in that of Figure 1 for obtaining a free running drive shaft in either direction of rotation and irrespective of its driving operation on shaft 30.

While the foregoing shaft coupling mechanism will perform its function in the manner described for imposing a limit on the unidirectional rotational displacement of the driven shaft, it will not afford such a limitation for each direction of driven shaft rotation. Accordingly a mechanism satisfying the latter requirement is disclosed in Figure 6 and comprises essentially a modified pair of coupling devices of the type shown in Figure 4 placed in axial alignment such that one of the clutch units provides the power transmitting agency between these two coupling units. As shown, the composite coupling includes a first coupling 55 associated with the driving shaft 25 and arranged through its clutch unit 56 to rotate or prevent rotation of an interconnected transmission shaft 57 arranged in a second coupling 58, the latter coupling having a clutch unit 59 arranged to connect or disconnect driven shaft 30. The agency adapted to actuate the clutch unit 56 is the traveling cup-nut 70, similar to the cup-nut 42, previously described, which travels or floats on the right hand threaded portion 71 of the drive shaft 25. Similarly, clutch unit 59 is actuated by the cup-nut 72 which moves or floats on the left hand threaded portion 73 of transmission shaft 57. Shaft 25 is mounted in a ball bearing 60 carried in end plate 61, transmission shaft 57 is operated in a second bearing 62, driven shaft 30 is carried in a third bearing 63, and the several parts and operating elements of the coupling mechanism are enclosed in axially aligned cylindrical housing members 64, 65, 66 and 67 flange mounted in cooperating relationship as shown. It is to be noted that the threaded portions 71 and 73 have the same pitch but are of opposite hand as regards the threading action on the respective traveling cup-nuts 70 and 72. Thus, upon rotation of the shaft 57 with drive shaft 25, the nuts 70 and 72 will move or float in opposite directions so that for the extreme positions nuts 70 and 72 will be a maximum or minimum distance apart. In Figure 6, the cup-nut 70 moves from the full line position, where it has run off the right hand end of threaded shaft 26 but may be moved into threaded position by the spring pressed plate assembly 48, to the dotted line position, where it acts to separate or break the connection at clutch unit 56. Similarly, the cup-nut 72 oscillates or floats on threaded shaft 26 between the two extreme dotted line positions and is retheaded after reaching a run-off position by the spring pressed plate assembly 48 at the right and the spring pressed clutch member or clutch unit 59 at the left.

The assembly of this double coupling mechanism may be carried out in any convenient manner and the cup-nuts 70 and 72 need not be positioned in any particular initial relation. For example, the nuts may assume the full line positions shown after initial assembly. The coupling may then be conditioned for automatic operation by turning shaft 25 until the nut 70 reaches the full line position and the nut 72 reaches the dotted line position at the extreme left. Shaft 30 will then be uncoupled, but upon reverse rotation of shaft 25 the nuts will move toward the center of the coupling unit and shaft 30 will attain its coupled condition. Continued rotation of driving shaft 25 will drive shaft 30 until the traveling nuts 70 and 72 reach the opposite positions, where clutch unit 56 will break or separate and the nut 72 moves off the shaft. The transmission shaft 57 will then be uncoupled from shaft 25 and further rotation of driven shaft 30 prevented. This cycle of operation establishes a definite and predeterminable limitation on the number of turns or revolutions imparted to the driven shaft 30. It is understood that the threaded portions 71 and 73 may be varied as the occasion demands or according to the requirements of the mechanism or device operably associated with the driven shaft 30. For example, the length of the threaded portions 71 and 73 may be different from each other, to permit a greater number of rotations in one direction than in the opposite direction.

An important feature of the present mechanism, and one which assures positive clutch action for maintaining the relationship between the shaft 25 and the shaft 30, resides in the form and relation of the mating clutch teeth 29 and 36. Whether the coupling mechanism is intended to impart a definite number of turns to shaft 30 in one direction (Figure 1) or in both directions (Figure 6), it is important that the action of the clutch units be arranged to maintain the exact operation desired. Obviously, should the clutch unit fail to make or break contact properly or within the desired rotational phase of the shaft 25 an error will result which will be reflected by the driven shaft. The arrangement is such that the improper clutch action will produce a cumulative error at the driven shaft. Elimination of any such faults has been obtained by proper clutch tooth design, enlarged fragmentary tooth sections being illustrated in Figures 7 and 8. In Figure 7 the clutch teeth are shown in several stages of approach and engagement which is intended to occur during one complete revolution of the clutch plate 28 on drive shaft 25 and on which plate teeth 29 are formed. The clutch tooth engaging action is as follows: When referring to Figure 7A it must be understood that the clutch plates 28 and 35 are in the positions of separation shown by Figure 2. When shaft 25 is revolved to retract or move nut 42 to the right, the adjacent and complementary teeth 29 and 36 will approach the positions shown and tooth 29 will rotate while tooth 36 advances longitudinally with little or no rotation. Continued movement of these teeth will bring the face planes 82 and 81 or the beveled faces 82 and 83 into contact, depending on the extent of relative motion produced by the threading retraction of nut 42 and angular displacement of tooth 29. When this contact is made, tooth 36 will tend to rotate with tooth 29 but because of the longitudinal motion permitted for clutch plate 35 tooth 36 will be forced or cammed away from tooth 29 and against the spring load created by element 40 (Figure 2). A sliding action occurs until tooth 29 moves past tooth 36 whereupon the spring 40 will cause tooth 36 to advance to a position between the tooth 29 just cleared and the next tooth 29 advancing to take its place. The pitch of threads on shaft 26, however, has retracted nut 42 sufficiently so that tooth 36 now moves into the space between the two teeth 29 and upon tooth contact the points 84 and 85 on teeth 29 and 36 respectively have overlapped or assumed a locked relation (Figure 7B). Thereafter rotation of tooth 29 combined with spring urged advance of tooth 36 will produce the fully meshed tooth position of Figure 7C. It is thus evident that the meshing progression of these teeth (Figures 7A and 7B) occurs during one-half revolution of shaft 25 and thereafter the clutch unit 28—35 moves in unison revolving driven shaft 30 in phase with drive shaft 25. Continued rotation of shaft 25 will simply move nut 42 to the right as explained in connection with Figures 1 and 5.

Figures 8A, 8D:
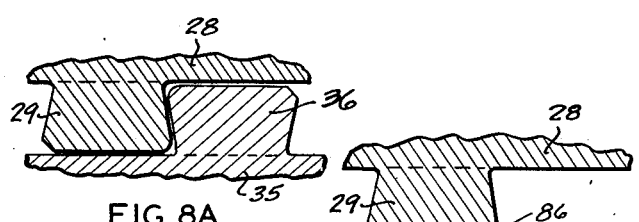
Figure 8B:
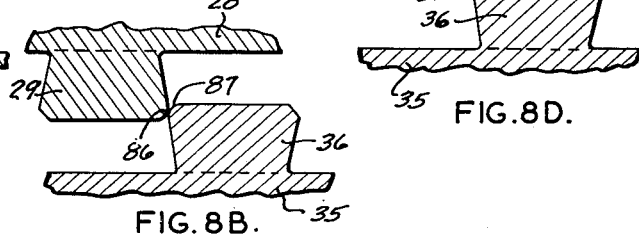

Upon reversal of drive shaft 25 traveling nut 42 advances toward the clutch unit until contact is made on the outer face margin of plate 35. Progressive advance of the nut 42 will effect a combined rotational displacement and axial sliding separation of teeth 29 and 36, as in Figures 8A and 8B. As tooth positions in Figure 8B are reached the nut 42 attains or reaches a point where an additional one-half revolution will cause it to run off the threads. In this final half revolution the teeth 29 and 36 are moved by the axial displacement of the nut 42 to a position from that in Figure 8B to that in Figure 8C or slightly beyond. At this point the rounded nose margins 86 and 87 of teeth 29 and 36 respectively produce an unlocked or unstable condition of tooth engagement so that they slide off or separate as illustrated in Figure 8D. Thereafter driven shaft 30 will cease rotation but drive shaft 25 may continue revolving until the power unit is cut off.

The form and shape of the clutch teeth are admirably suited to the transmission of high torque loads throughout the period of approach to full mesh and full release. To point out one feature, the beveled faces 82 and 83 act to reduce or eliminate the build-up of high loads within the normally weakest zone of the teeth by delaying the time of a locked tooth condition (Figure 7B) until the teeth can move into an interlocked or meshed position with a substantial overlap. Likewise, the rounded nose portions 86 and 87 on the separating side of the clutch teeth (Figure 8C) are provided as the proper expedient to eliminate high loads or forces in the face zones of these teeth.

It is now evident that the clutch teeth design and operation under the direct influence of the traveling nut 42 will positively preclude the occurrence or development of high tooth pressures in the marginal portions first or last to make contact. Moreover, the control of rotational phase relationship between the driving and driven shafts (Figure 1) or between the driving, transmission and driven shafts (Figure 6) is definitely assured. The foregoing coupling mechanism provides a very compact, simple and entirely automatic arrangement for controlling the transmission of power or rotational effort in one direction or both directions of rotation of a drive shaft. An additional feature resides in the single thread on shaft portion 26 which assures that the clutch plates 28 and 35 will always maintain a given relation and position of teeth at the moment nut 42 reaches the position of run-off or at the time it is picked up again by the threaded shaft.

The above-described automatic coupling mechanism finds one useful application in connection with the operation of control surfaces, such as ailerons, flaps, elevators or rudders, on an aircraft. In this regard it is the general practice to operate the control surfaces from the extreme positions through a predetermined and limited angular amount which must not be exceeded without endangering the safe operation of the aircraft. Various safety devices have been employed to control the control surface movement by cutting off the control surface actuating power unit, but functional failures of these devices continue to plague the designers and manufacturers of airplanes. The present coupling mechanism may be used to overcome such failures by automatically disconnecting the control surface operating mechanism from the power unit without necessitating the addition of safety cut-out devices of any nature. Installation of the coupling simply requires a connection with the power unit at the driving shaft 25 and a second connection with the control surface actuating mechanism at driven shaft 30. It is obvious that the degree of displacement required can be obtained from the automatic coupling by the proper design of the threaded shaft portion 26. Practical applications for this automatic coupling mechanism other than in aircraft will suggest themselves or become apparent after due consideration hereof.

Although the invention has been described with reference to several specific embodiments thereof, it is understood that it is not to be limited thereto, except as defined by the appended claims.

We claim:

1. A power transmission mechanism, comprising a fixed housing, a driving shaft and a driven shaft rotatable within said housing, a first clutch element in fixed axial and rotational relationship with said driving shaft, a second clutch element rotating with said driven shaft and axially slidable with respect thereto and having a larger diameter than said first clutch element, a spring normally urging said second clutch element into driving engagement with said first clutch element, a threaded portion on said driving shaft, a nut normally threaded on said threaded portion, and an annular flange on said nut extending towards said clutch elements and having an inside diameter greater than the diameter of said first clutch element but less than the diameter of said second clutch element, said nut being movable towards said second clutch element to force said second clutch element out of driving engagement with said first clutch element against the resistance of said spring upon rotation of the driving shaft in one direction, and said nut being movable away from said second clutch element to allow said spring to bring the clutch elements into driving engagement upon rotation of the driving shaft in the opposite direction.

2. A power transmission mechanism, comprising a fixed housing, a driving shaft and a driven shaft rotatable within said housing, a first clutch element in fixed axial and rotational relationship with said driving shaft, a second clutch element rotating with said driven shaft and axially slidable with respect thereto and having a larger diameter than said first clutch element, a first spring normally urging said second clutch element into driving engagement with said first clutch element, a threaded portion on said driving shaft, a first unthreaded portion on said driving shaft between said threaded portion and said first clutch element, a second unthreaded portion on said driving shaft between said threaded portion and an end wall of said housing, a nut normally threaded on said threaded portion but adapted to run off onto said unthreaded portions at the ends of its travel, second spring means urging said nut toward said threaded portion when said nut is on said second unthreaded portion, and an annular flange on said nut extending towards said clutch elements and having an inside diameter greater than the diameter of said first clutch element but less than the diameter of said second clutch element, said nut being movable towards said second clutch element to force said second clutch element out of driving engagement with said first clutch element against the resistance of said spring upon rotation of the driving shaft in one direction, and said nut being movable away from said second clutch element to allow said spring to bring the clutch elements into driving engagement upon rotation of the driving shaft in the opposite direction.

3. A power transmission mechanism, comprising a fixed housing, a driving shaft, a transmission shaft, a driven shaft, all three said shafts being rotatable within said housing, a first clutch element rotating with said driving shaft, second and third clutch elements rotating with said transmission shaft, a fourth clutch element rotating with said driven shaft, first and second resilient means normally urging said first and second clutch elements and said third and fourth clutch elements, respectively, into driving engagement, means operative to disengage said first and second clutch elements after a predetermined number of revolutions of said driving shaft in one direction, and means operative to disengage said third and fourth clutch elements after a predetermined number of revolutions of said driving shaft in the opposite direction.

4. A power transmission mechanism, comprising a fixed housing, a driving shaft, a transmission shaft, a driven shaft, all three said shafts being rotatable within said housing, a first clutch element in fixed axial and rotational relationship with said driving shaft, a second clutch element rotating with said transmission shaft and axially slidable with respect thereto, a third clutch element in fixed axial and rotational relationship with said transmission shaft, a fourth clutch element rotating with said driven shaft and axially slidable with respect thereto, first and second resilient means normally urging said first and second clutch elements, and said third and fourth clutch elements, respectively, into driving engagement, means operative to disengage said first and second clutch elements after a predetermined number of revolutions of said driving shaft in one direction, and means operative to disengage said third and fourth clutch elements after a predetermined number of revolutions of said driving shaft in the opposite direction.

5. A power transmission mechanism, comprising a fixed housing, a driving shaft, a transmission shaft, a driven shaft, all three said shafts being rotatable within said housing, a first clutch element in fixed axial and rotational relationship with said driving shaft, a second clutch element rotating with said transmission shaft and axially slidable with respect thereto, a third clutch element in fixed axial and rotational relationship with said transmission shaft, a fourth clutch element rotating with said driven shaft and axially slidable with respect thereto, first and second springs normally urging said first and second clutch elements, and said third and fourth clutch elements, respectively, into driving engagement, a threaded portion on said driving shaft, a first nut normally threaded on said threaded portion of said driving shaft, said first nut being movable toward said second clutch element to force said second clutch element out of driving engagement with said first clutch element against the resistance of said first spring upon rotation of the driving shaft in one direction, and said first nut being movable away from said second clutch element to allow said first spring to bring said first and second clutch elements into driving engagement upon rotation of the driving shaft in the opposite direction, a threaded portion on said transmission shaft, and a second nut normally threaded on said threaded portion of said transmission shaft, said second nut being movable toward said fourth clutch element to force said fourth clutch element out of driving engagement with said third clutch element against the resistance of said second spring upon rotation of the driving shaft in said second mentioned direction, and said second nut being movable away from said fourth clutch element to allow said second spring to bring said third and fourth clutch elements into driving engagement upon rotation of the driving shaft in said first mentioned direction.

6. A power transmission mechanism, comprising a fixed housing, a driving shaft, a transmission shaft, a driven shaft, all three said shafts being rotatable within said housing, a first clutch element in fixed axial and rotational relationship with said driving shaft, a second clutch element rotating with said transmission shaft and axially slidable with respect thereto and having a larger diameter than said first clutch element, a third clutch element in fixed axial and rotational relationship with said transmission shaft, a fourth clutch element rotating with said driven shaft and axially slidable with respect thereto and having a larger diameter than said third clutch element, first and second springs normally urging said first and second clutch elements, and said third and fourth clutch elements, respectively, into driving engagement, a threaded portion on said driving shaft, a first nut normally threaded on said threaded portion of said driving shaft, an annular flange on said first nut extending toward said first and second clutch elements and having an inside diameter greater than the diameter of said first clutch element but less than the diameter of said second clutch element, said first nut being movable toward said second clutch element to force said second clutch element out of driving engagement with said first clutch element against the resistance of said first spring upon rotation of the driving shafts in one direction, and said first nut being movable away from said second clutch element to allow said first spring to bring said first and second clutch elements into driving engagement upon rotation of the driving shaft in the opposite direction, a threaded portion on said transmission shaft, a second nut normally threaded on said threaded portion of said transmission shaft, and an annular flange on said second nut extending toward said third and fourth clutch elements and having an inside diameter greater than the diameter of said third clutch element but greater than the diameter of said fourth clutch element, said second nut being movable toward said fourth clutch element to force said fourth clutch element out of driving engagement with said third clutch element against the resistance of said second spring upon rotation of the driving shaft in said second mentioned direction, and said second nut being movable away from said fourth clutch element to allow said second spring to bring said third and fourth clutch elements into driving engagement upon rotation of the driving shaft in said first mentioned direction.

DAVID C. GIBSON.
WALTER E. LEMP.

REFERENCES CITED

The following references are of record in the file of this patent:

UNITED STATES PATENTS

| Number | Name | Date |
| --- | --- | --- |
| 1,213,354 | Grindall | Jan. 23, 1917 |
| 1,730,526 | Pencoast | Oct. 8, 1929 |
| 2,433,488 | Schultz | Dec. 30, 1947 |

FOREIGN PATENTS

| Number | Country | Date |
| --- | --- | --- |
| 552,485 | Great Britain | Apr. 9, 1943 |